(12) United States Patent
Daugherty (10) Patent No.: US 8,118,192 B2
(45) Date of Patent: Feb. 21, 2012

(54) METHODS, SYSTEMS, AND PRODUCTS FOR MARKING CONCEALED OBJECTS

(75) Inventor: Michael Daugherty, Carmichael, CA (US)

(73) Assignee: AT&T Intellectual Property I, L. P., Altanta, GA (US)

( * ) Notice: Subject to any disclaimer, the term of this patent is extended or adjusted under 35 U.S.C. 154(b) by 748 days.

(21) Appl. No.: 12/207,552

(22) Filed: Sep. 10, 2008

(65) Prior Publication Data

US 2010/0058983 A1  Mar. 11, 2010

(51) Int. Cl.
    *B67D 7/84* (2010.01)

(52) U.S. Cl. ..... 222/174; 222/191; 222/325; 222/402.1; 222/402.15; 222/402.21; 324/326

(58) Field of Classification Search .......... 222/173–175, 222/162, 608, 610, 611.1, 183, 402.1, 191–192, 222/402.15, 402.21, 325; 427/136–137; 324/326, 329, 331, 345, 66–67
See application file for complete search history.

(56) References Cited

U.S. PATENT DOCUMENTS

| | | | |
|---|---|---|---|
| 2,720,422 A * | 10/1955 | Mercur | 222/174 |
| 2,893,606 A * | 7/1959 | Hawkins | 222/174 |
| 3,485,206 A | 12/1969 | Smrt | |
| 3,716,195 A * | 2/1973 | Silva | 239/375 |
| 3,977,570 A * | 8/1976 | Smrt | 222/174 |
| 4,099,482 A | 7/1978 | Smrt | |
| 4,886,191 A * | 12/1989 | Yoshitomi | 222/174 |
| 5,025,150 A | 6/1991 | Oldham et al. | |
| 5,368,202 A | 11/1994 | Smrt | |
| 5,518,148 A * | 5/1996 | Smrt | 222/174 |
| 5,769,279 A | 6/1998 | Smrt | |
| 5,918,565 A * | 7/1999 | Casas | 116/211 |
| 6,026,135 A | 2/2000 | McFee et al. | |
| 6,053,260 A | 4/2000 | Boon et al. | |
| 6,435,129 B1 | 8/2002 | McDonald et al. | |
| 6,723,375 B2 | 4/2004 | Zeck et al. | |
| 6,802,278 B2 * | 10/2004 | McDonald et al. | 116/211 |
| 7,048,151 B1 * | 5/2006 | Wertz et al. | 222/174 |
| 7,372,247 B1 * | 5/2008 | Giusti et al. | 324/67 |
| 7,640,105 B2 * | 12/2009 | Nielsen et al. | 701/213 |

\* cited by examiner

*Primary Examiner* — Frederick C. Nicolas
(74) *Attorney, Agent, or Firm* — Scott P. Zimmerman PLLC (57) ABSTRACT

Methods, systems, apparatuses, and products are disclosed for locating concealed objects by discharging the contents of an aerosol container. A housing encloses an inner volume, and a hollow conduit extends along the housing. An elongate rod slides within the conduit. An actuator of the aerosol container is engaged between a discharge position and a non-discharge position by movement of the elongate rod.

15 Claims, 13 Drawing Sheets

METHODS, SYSTEMS, AND PRODUCTS FOR MARKING CONCEALED OBJECTS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to coating apparatuses and processes, to measurement and testing of electricity in the geophysical surface, to marking the earth, and to dispensing aerosol containers.

Various techniques are used to locate concealed objects. Electromagnetic signals, for example, are used to locate underground caverns, buried treasure, vintage arsenals, shipwrecks, and even tumors and other health conditions. Electromagnetic signals are even used to locate buried or underground utility wires, telephone lines, cables, and fiber optic lines. Utility crews use specially-developed "cable locators" that detect electromagnetic signals. These electromagnetic signals can be used to indicate the location of buried or underground wires and cables. Aerosol containers are also used to mark the location of concealed objects. When a buried utility cable, for example, is located, a technician marks the location of the buried cable using spray paint.

Unfortunately, though, electromagnetic detection of a buried cable is a separate effort from marking the location of the buried cable. Presently, a technician locates a buried cable using the electromagnetic-receiving "cable locator." When the buried cable is located, the technician then uses a paint can (and sometimes flags) to mark the earth. The paint indicates the direction or path of the buried cable. That is, the technician carries the electromagnetic-receiving "cable locator" in one hand, and the technician carries a paint can in the other hand. Strength is needed to accurately sweep the cable locator with the one hand, while a strong back is needed to stoop and spray paint with the other hand. Accuracy often requires that several trips be made along the path of the buried cable. Needless to say, then, an improve detection and marking apparatus would save time and reduce the possibility of physical injury.

SUMMARY

The exemplary embodiments provide methods, systems, apparatuses, and products for discharging the contents of an aerosol container. The aerosol container has an actuator that discharges the contents. The apparatus has an elongate rod sliding within a conduit. The conduit has an upper end with an upper orifice through which an upper portion of the elongate rod slides. The conduit has a bottom orifice in a bottom floor through which a bottom portion of the elongate rod slides. The conduit also has an inner wall defining a longitudinal axis. Means for actuating the actuator of the aerosol container are also included, such that movement of the elongate rod within the conduit moves the actuator between a discharge position and a non-discharge position.

More exemplary embodiments include another apparatus for locating a concealed object and for discharging the contents of an aerosol container. The aerosol container has an actuator that discharges the contents to indicate a location of the concealed object. A housing encloses an inner volume, and a hollow conduit extends along the housing. The conduit has an upper end with an upper orifice to an outer surface of the housing. The conduit has a bottom floor with a bottom orifice in the bottom floor. The conduit has an inner wall that defines a longitudinal axis. An elongate rod slides within the conduit. The elongate rod has an upper portion extending through the upper orifice and a lower portion extending through the bottom orifice. Means for actuating the actuator of the aerosol container are also included, such that movement of the elongate rod within the conduit moves the actuator between a discharge position and a non-discharge position.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
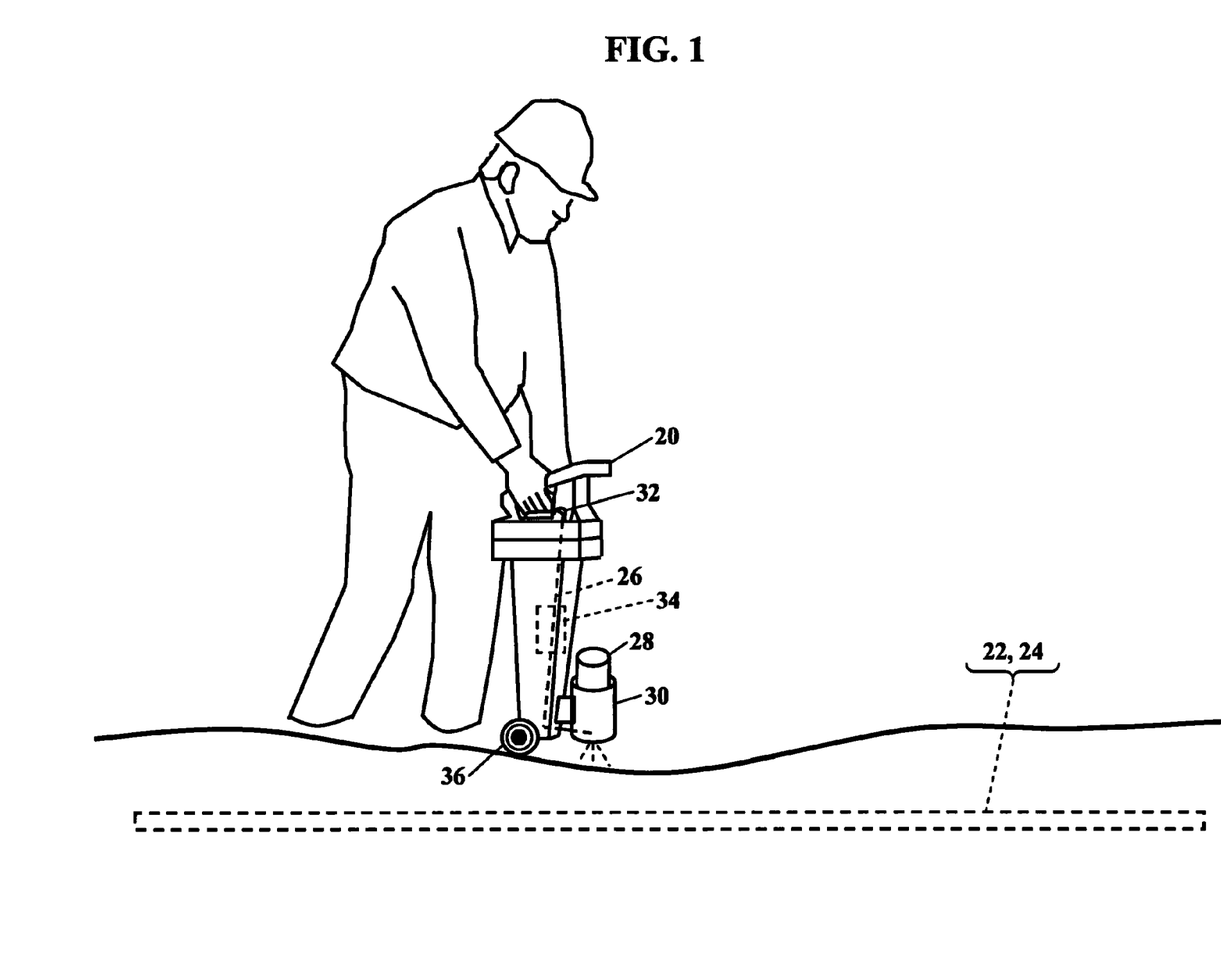
FIG. 1 is a schematic illustrating an environment in which exemplary embodiments may be implemented.

FIG. 1 is a simplified schematic illustrating an environment in which exemplary embodiments may be implemented. A user holds an electromagnetic locator 20 and "sweeps" an area for a concealed object 22. FIG. 1 illustrates the concealed object 22 as a buried cable 24, but the electromagnetic locator 20 may be designed or adapted to locate any buried, underground, and/or concealed object (such as treasure or arsenal). Here, though, the electromagnetic locator 20 includes an apparatus 26 for dispensing the contents of an aerosol container 28. The aerosol container 28 inserts into a holder 30. When the aerosol container 28 contains paint, the apparatus 26 allows the user to quickly and easily mark the location of the buried cable 24. A trigger mechanism 32, for example, allows the user to hold the electromagnetic locator 20 with one hand and, with a finger of the same hand, dispense the contents of the aerosol container 28. The user, then, is able to "sweep" and mark the location of the buried cable 24 with one hand and with reduced stooping, thus freeing the other hand for other operations. An electromagnetic shield 34 reduces electromagnetic interference caused by the trigger mechanism 32. According to exemplary embodiments, a wheel 36 extending from, or mounted to, the electromagnetic locator 20 follows the contour of the earth, thus further relieving the user from back strain.

Figure 2:
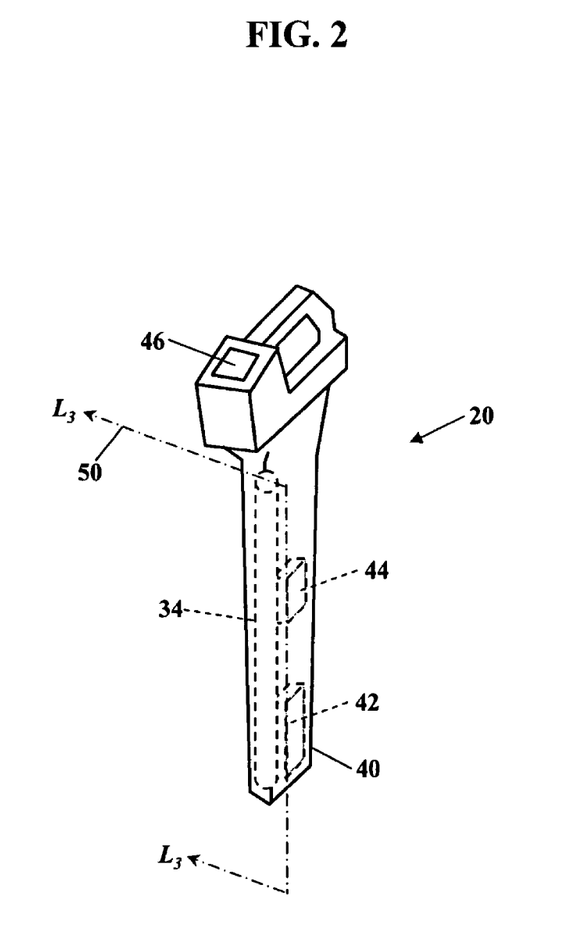
FIG. 2 is a schematic illustrating some electrical componentry of an electromagnetic locator 20, according to exemplary embodiments.

FIG. 2 is a schematic illustrating some electrical componentry of the electromagnetic locator 20, according to exemplary embodiments. The electromagnetic locator 20 has an outer housing 40 that encloses at least some of the electrical componentry. A receiver 42 receives electromagnetic signals, a processor 44 processes the electromagnetic signals, and a user interface 46 indicates the location of the concealed object (e.g., the buried cable 24 illustrated in FIG. 1), based upon the processed electromagnetic signals. The user interface 46, for example, may include a display device that visually displays frequency, signal strength, waveform, depth, or other indication of the location of the concealed object. The user interface 46 may also include an audible aspect (such as a speaker or piezoelectric element) that audibly indicates the location of the concealed object. The electromagnetic shield 34 reduces electromagnetic interference to maintain the accuracy of the receiver 42 and the processor 44. The electrical componentry of the electromagnetic locator 20, however, is only simply illustrated. Because the architecture and operating principles of electromagnetic detectors are well known, their hardware and software components are not further shown and described. If the reader desires more details, the reader is invited to consult the following sources: 3M DYNATEL®, OPERATOR MANUAL FOR 2250/2273 ME SERIES (2004); 3M, CABLE AND PIPE LOCATING TECHNIQUES (1998); 3M DYNATEL®, BULLETIN: 2273 ADVANCED CABLE/FAULT LOCATOR (1999); U.S. Pat. No. 5,231,555; U.S. Pat. No. 5,264,795; and U.S. Pat. No. 5,361,029.

Figure 3:
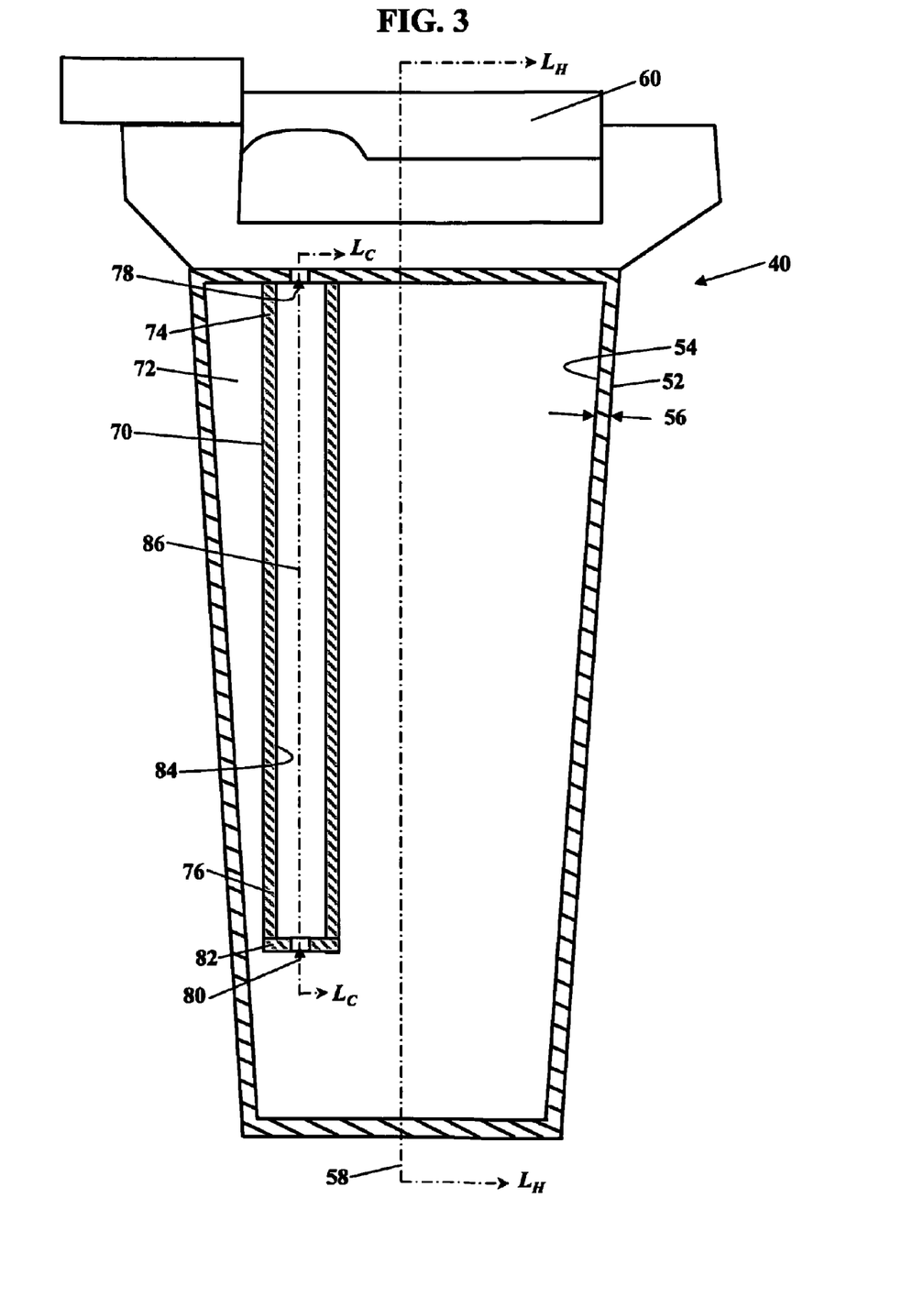
FIG. 3 is a schematic illustrating a sectional view of an outer housing of the electromagnetic locator, according to exemplary embodiments.

FIG. 3 is a schematic illustrating a partial, sectional view of the outer housing 40 of the electromagnetic locator 20, according to exemplary embodiments. Here the outer housing 40 has been sectioned along line $L_3$-$L_3$ of FIG. 2 (illustrated as reference numeral 50). The housing 40 has an outer surface 52 and an inner surface 54. The housing 40 has a material thickness 56, which may vary depending on material, strength, and other design or usage requirements. Although the housing 40 may have any shape, FIG. 3 illustrates the housing 40 as having a generally longitudinal shape with a longitudinal axis $L_H$-$L_H$ (illustrated as reference numeral 58). The housing 40 may also include an upper handle 60 through which the user curls the fingers of the hand.

The housing 40 also includes a conduit 70. The conduit 70 is preferably a hollow passage that extends at least partially along the housing 40. Although the conduit 70 is illustrated within an inner region or volume 72 of the housing 40, the conduit 70 may extend along or adjacent to the outer surface 52 of the housing 40. The conduit 70 has an upper end 74 and a lower end 76. The upper end 74 of the conduit 70 may include an upper orifice 78 (such as an opening or hole) through the material thickness 56 to the outer surface 52 of the housing 40. The conduit 70 may also have a bottom orifice 80 (again, an opening or hole) in a bottom floor 82. The conduit 70 has an inner wall 84 that defines a longitudinal axis $L_C$-$L_C$ (illustrated as reference numeral 86). The longitudinal axis $L_C$-$L_C$ of the conduit 70 may or may not be substantially parallel with the longitudinal axis $L_H$-$L_H$ (illustrated as reference numeral 58) of the housing 40. The conduit 70 may have any length that suits the design and arrangement of the internal componentry of the electromagnetic locator 20.

Figure 4:
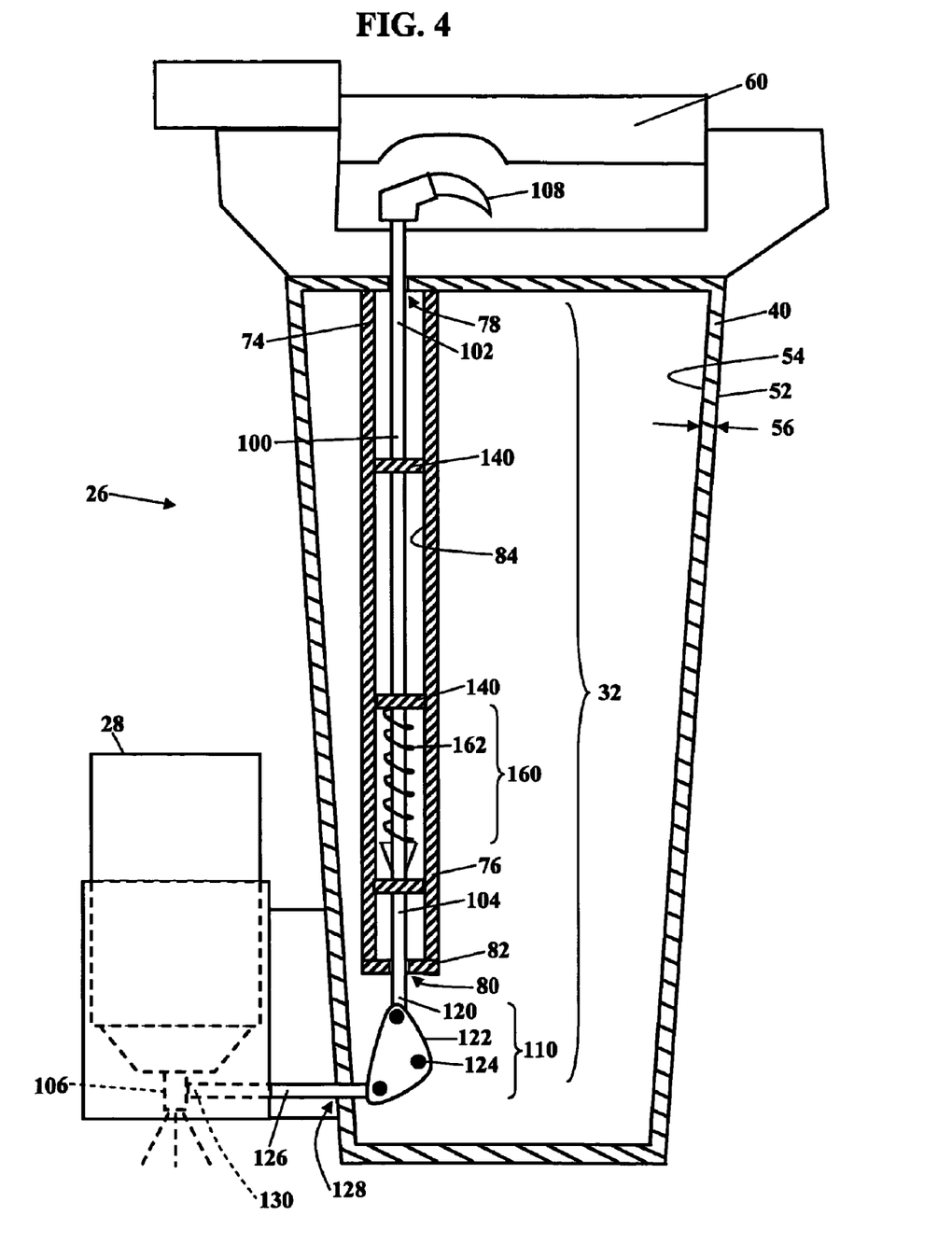
FIGS. 4 and 5 also illustrate one or more rod guides, according to exemplary embodiments.

FIG. 4 is a schematic illustrating the apparatus 26 for dispensing the contents of the aerosol container 28, according to exemplary embodiments. The apparatus 26 is shown in an enlarged view for clarity. The outer housing 40 has again been sectioned along line $L_3$-$L_3$ of FIG. 2 to reveal the trigger mechanism 32. An elongate rod 100 slides within the conduit 70. The elongate rod 100 has an upper portion 102 that extends through the upper orifice 78 in the conduit 70. The elongate rod 100 has a lower portion 104 that extends through the bottom orifice 80. The trigger mechanism 32 also includes means for actuating an actuator 106 of the aerosol container 28. As those of ordinary skill in the art understand, the aerosol container 28 has the actuator 106 that discharges the contents of the aerosol container 28. The actuator 106 is forcibly moved or displaced to a discharge position that discharges the contents of the aerosol container 28. When the force is removed or sufficiently reduced, the actuator 106 assumes or moves to a non-discharge position, in which the contents of the aerosol container 28 are no longer discharged. A trigger 108, for example, at the upper portion 102 of the elongate rod 100 allows the user's finger to operate the means for actuating the actuator 106 of the aerosol container 28. As the user's hand grasps the handle 60, the user's finger may lift, depress, or otherwise move the trigger 108, thus causing movement of the elongate rod 100 within the conduit 70. According to exemplary embodiments, a cam mechanism 110 translates the movement of the elongate rod 100 to discharge the contents of the aerosol container 28 (e.g., can of spray paint) and, thus, to mark the location of the concealed object.

FIG. 4 illustrates the cam mechanism 110. A bottom end 120 of the elongate rod 100 is attached to a cam 122. The cam 122 pivots about a pivot mount 124. An actuator arm 126 is also attached to the cam 122. When the elongate rod 100 moves or slides within the conduit 70, the cam mechanism 110 translates that movement into lateral movement of the actuator arm 126. The actuator arm 126 extends through a passage or opening 128 in the housing 40. As later paragraphs and figures will explain, the actuator arm 126 has a distal end 130 that engages or bears against the actuator 106 of the aerosol container 28. As the user's finger move the trigger 108, the elongate rod 100 slides within the conduit 70. The cam mechanism 110 translates the relatively vertical movement of the elongate rod 100 into a relatively lateral movement of the actuator arm 126. The actuator arm 126 moves the actuator 106 to discharge the contents of the aerosol container 28.

Figure 5:
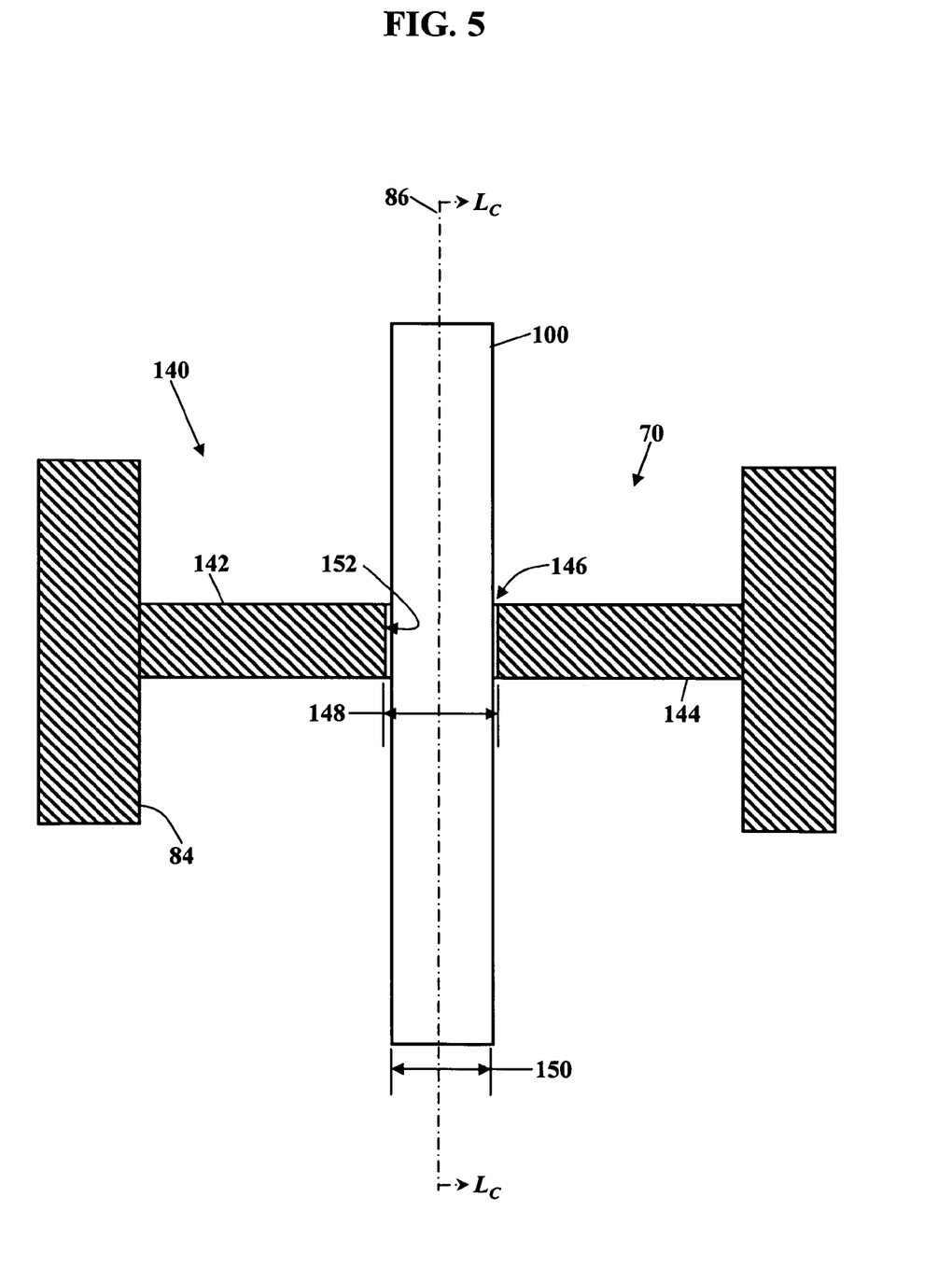

FIGS. 4 and 5 also illustrate one or more rod guides 140, according to exemplary embodiments. FIG. 4 illustrates a longitudinal spacing of the rod guides 140 within the conduit 70. The rod guides 140 may be longitudinally spaced along the conduit 70 to reduce or prevent lateral movement of the elongate rod 100. Each rod guide 140 thus guides, retains, or confines the elongate rod 100 to substantially vertical movement within the conduit 70. FIG. 5 is a detailed, enlarged schematic illustrating one rod guide 140. As FIG. 5 illustrates, each rod guide 140 outwardly and laterally extends from the inner wall 84 of the conduit 70. The rod guide 140 has an upper surface 142, a lower surface 144, and an open cylindrical passage 146 extending from the upper surface 142 to the lower surface 144 through which the elongate rod 100 slides. The upper surface 142 and the lower surface 144 are substantially perpendicular to the movement of the elongate rod 100 within the conduit 70. The cylindrical passage 146 has a passage diameter 148 that is greater than a rod diameter 150 of the elongate rod 100 to reduce frictional contact. The cylindrical passage 146 also has a side wall 152 that laterally confines the elongate rod 100. Although the rode guide 140 is illustrated as having the same width as the conduit 70, the rod guide 140 may only outwardly cantilever from the side wall 84 of the conduit 70. Each rod guide 140 is thus a ring member that retains the elongate rod 100 to substantially vertical movement within the conduit 70.

FIG. 4 also illustrates a retention mechanism 160, according to exemplary embodiments. A retention spring 162 is attached to the elongate rod 100 and restores the elongate rod 100 to a non-discharge position. When the elongate rod 100 is restored to a neutral or "off" position, the actuator arm 126 releases the actuator 106 to stop discharging the contents of the aerosol container 28. Although the retention spring 162 may have many configurations, FIG. 4 illustrates a coil-over arrangement in which the retention spring 162 has an inner diameter that is greater than the rod diameter of the elongate rod 100. The elongate rod 100 slides within and passes through the inner diameter of the retention spring 162.

Figure 6:
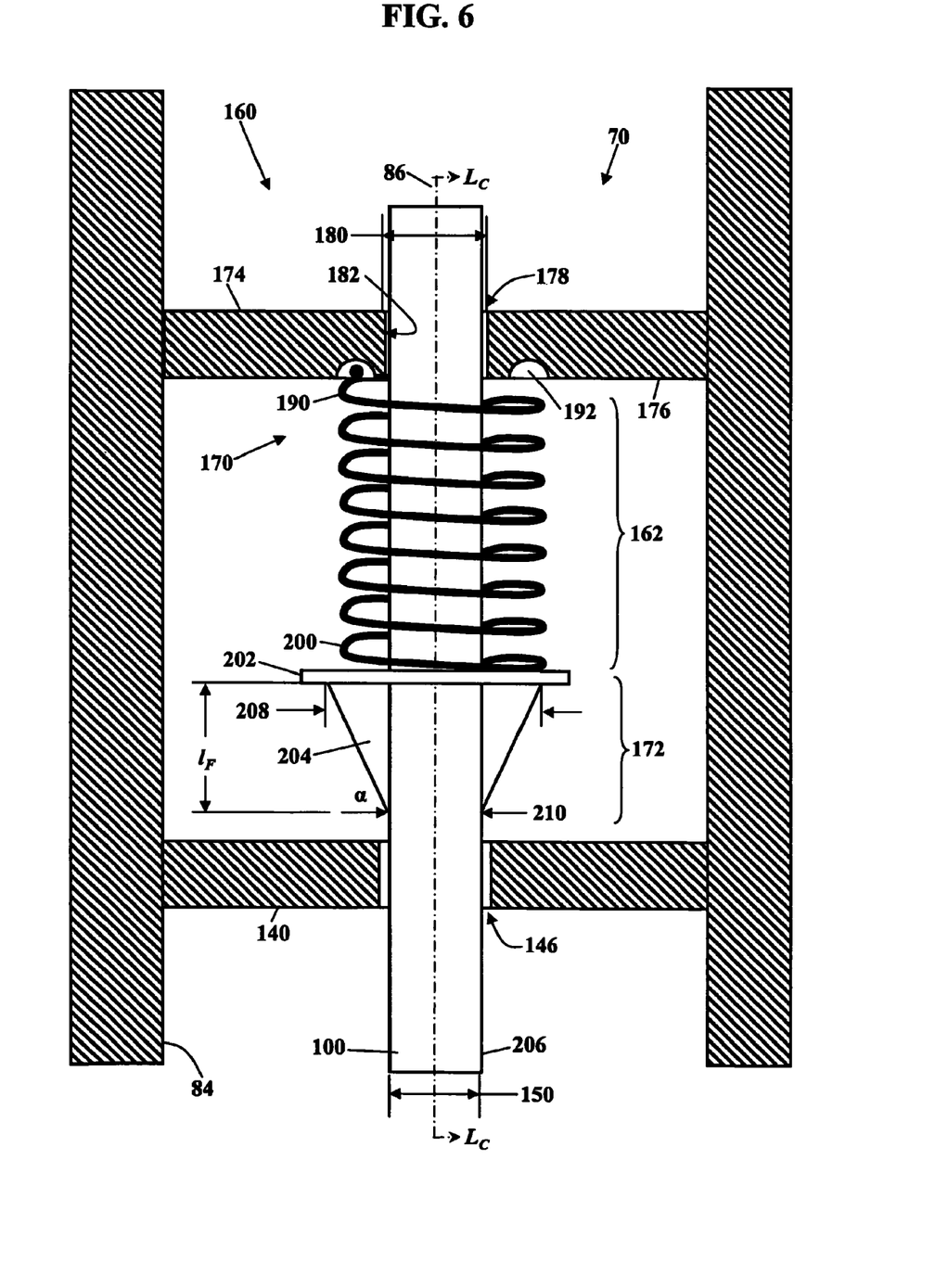
FIGS. 6-8 are detailed schematics illustrating a retention mechanism, according to exemplary embodiments.
Figure 7:
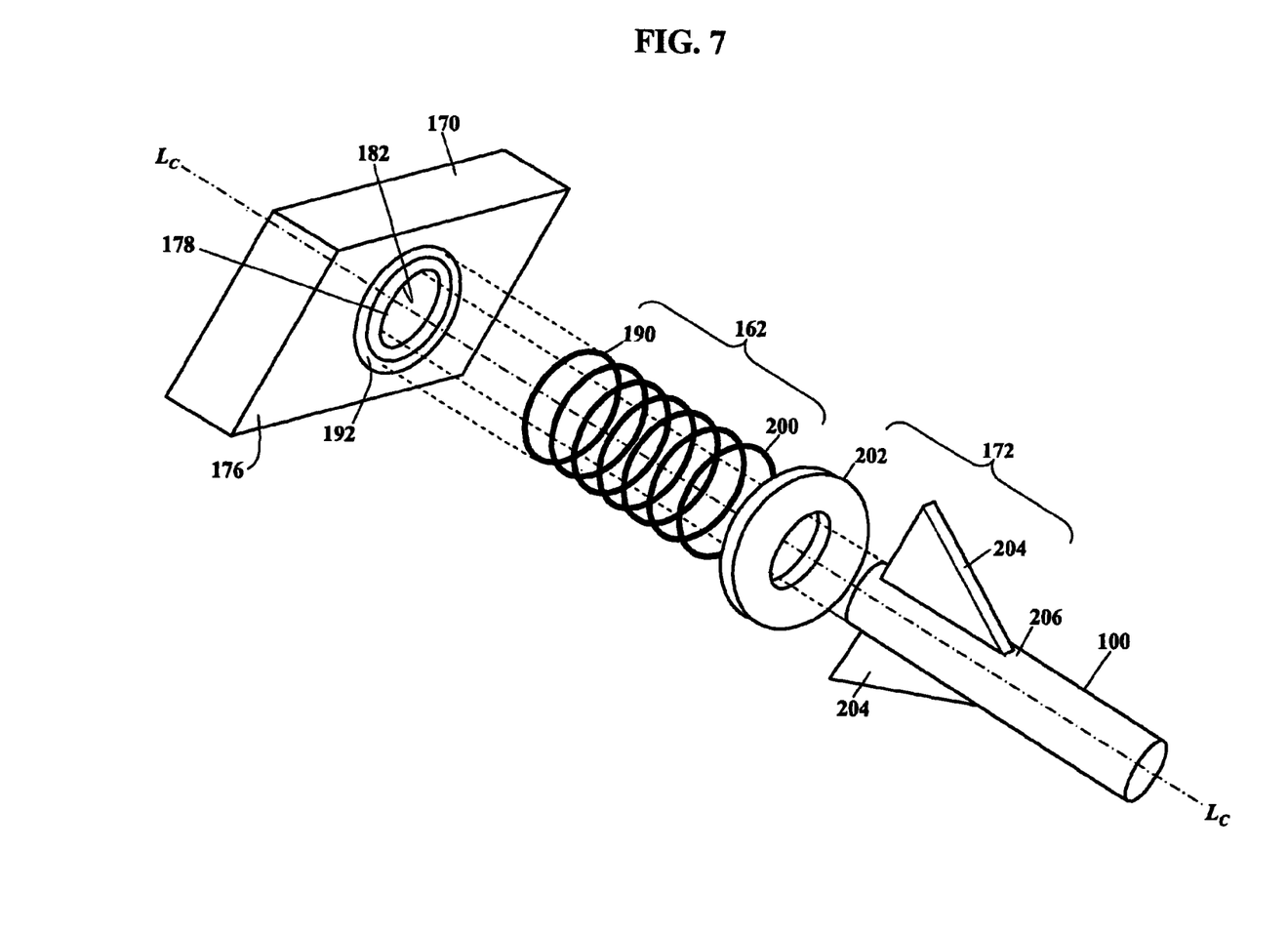
Figure 8:
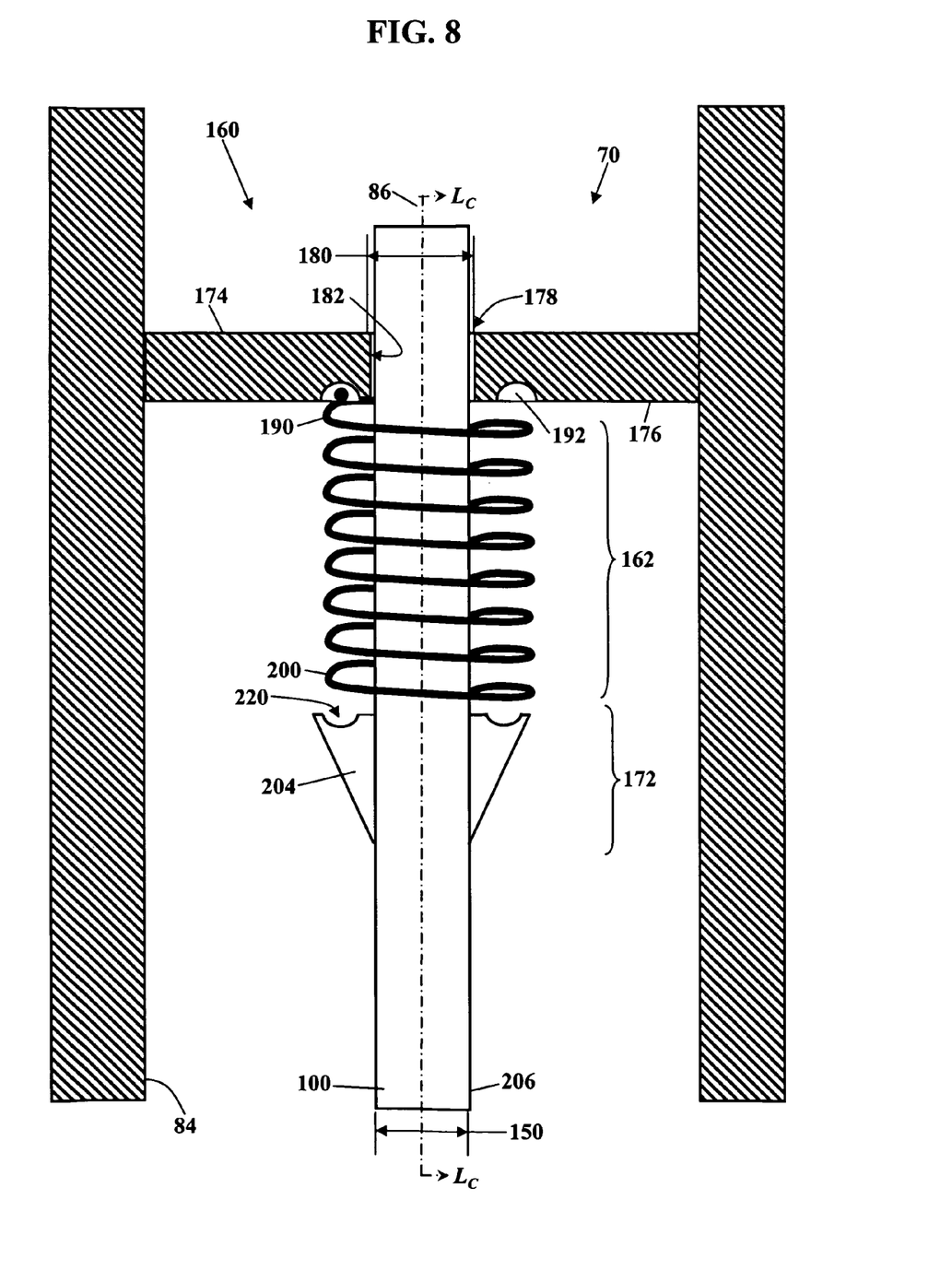

FIGS. 6-8 are detailed schematics illustrating the retention mechanism 160, according to exemplary embodiments. The retention mechanism 160 is illustrated in an enlarged view for clarity. As FIG. 6 illustrates, the retention spring 162 is retained between an upper spring mount 170 and a lower spring mount 172. The upper spring mount 170 laterally extends from the inner wall 84 of the conduit 70. The upper spring mount 170 has an upper surface 174 and lower surface 176 that are substantially perpendicular to the movement of the elongate rod 100 within the conduit 70. The upper spring mount 170 has an open cylindrical passage 178 extending from the upper surface 174 to the lower surface 176 through which the elongate rod 100 slides. The cylindrical passage 178 has a passage diameter 180 that is greater than the rod diameter 150 of the elongate rod 100, and the cylindrical passage 178 has a side wall 182 that laterally confines the elongate rod 100.

FIGS. 6 and 7 also illustrate the upper spring mount 170 and the lower spring mount 172. FIG. 7 is an exploded, isometric view of the details of the upper spring mount 170. An upper coil 190 of the retention spring 162 may be retained by the upper spring mount 170. The lower surface 176 of the upper spring mount 170 may include at least a semi-circular or circular channel 192. The channel 192 is sized such that the upper coil 190 of the retention spring 162 sits or seats within the channel 192. The channel 192 has a diameter, then, that is approximately equal to, or slightly greater than, a diameter of the upper coil 190. The channel 192 has a channel depth and a channel diameter that are slightly greater than a wire diameter of the upper coil 190 of the retention spring 162. The channel 192 has an arcuate floor with a radius at least equal to, or greater than, a radius of the wire size of the upper coil 190. The channel 192 thus laterally confines the upper coil 190 to a relatively or substantially concentric position with the elongate rod 100.

FIGS. 6-8 also illustrate the details of the lower spring mount 172. A bottom coil 200 of the retention spring 162 may be retained by the lower spring mount 172. A washer 202 rests between the lower coil 200 of the retention spring 162 and a pair of diametrically opposed flanges 204. Each flange 204 outwardly extends from an outer surface 206 of the elongate rod 100. The flanges 204 support the washer 202, and the bottom coil 200 of the retention spring 162 bears against the washer 202. The elongate rod 100 thus passes through the inner diameter of the retention spring 162 and through an inner diameter of the washer 202. The inner diameter of the washer 202 is thus sized greater than the rod diameter 150 of the elongate rod 100, but the inner diameter of the washer 202 is smaller than an inner coil diameter of the bottom coil 200.

The flanges 204 may also limit the travel of the elongate rod 100. As FIG. 6 best illustrates, the flanges 204 taper in width from an initial, major width 208 to a final, minor width 210. The combined diameter of the flanges 204 and the elongate rod 100 thus produces the major diameter 208 that tapers down to the minor diameter 208. If the flanges 204 taper to the elongate rod 100, then the minor diameter 210 is approximately the rod diameter 150. As the elongate rod 100 slides within the open cylindrical passage 146 of the rod guide 140, the flanges 204 may eventually contact the side wall (illustrated as reference numeral 152 in FIG. 5) of the open cylindrical passage 146. That is, according to exemplary embodiments, the inner diameter 148 of the open cylindrical passage 146 will be greater than the minor width 210, but the major width 208 is greater than the inner diameter 148 of the open cylindrical passage 146. At some point during the travel of the elongate rod 100, then, the flanges 204 contact the open cylindrical passage 146 and the elongate rod 100 is prevented from further movement. A length $l_F$ of the flanges 204, and their angle α of taper, may be chosen to suit the design parameters of the trigger mechanism 32.

FIG. 8 illustrates additional details of the lower spring mount 172. The washer 202 may be eliminated to reduce cost and to simplify assembly. Each flange 204, then, may include a notch 220 in which a portion of the bottom coil 200 rests or sits. The notch 220 is sized such that at least a portion of the bottom coil 200 of the retention spring 162 seats, sits, or rests within the notch 220. The notch 220 may thus have a notch depth and a notch diameter that are at least equal to, or greater than, a wire diameter of the bottom coil 200. When at least a portion of the bottom coil 200 sits or rests within the notch 220, the notch 220 laterally confines the bottom coil 200 to a relatively or substantially concentric position with the elongate rod 100.

Figure 9:
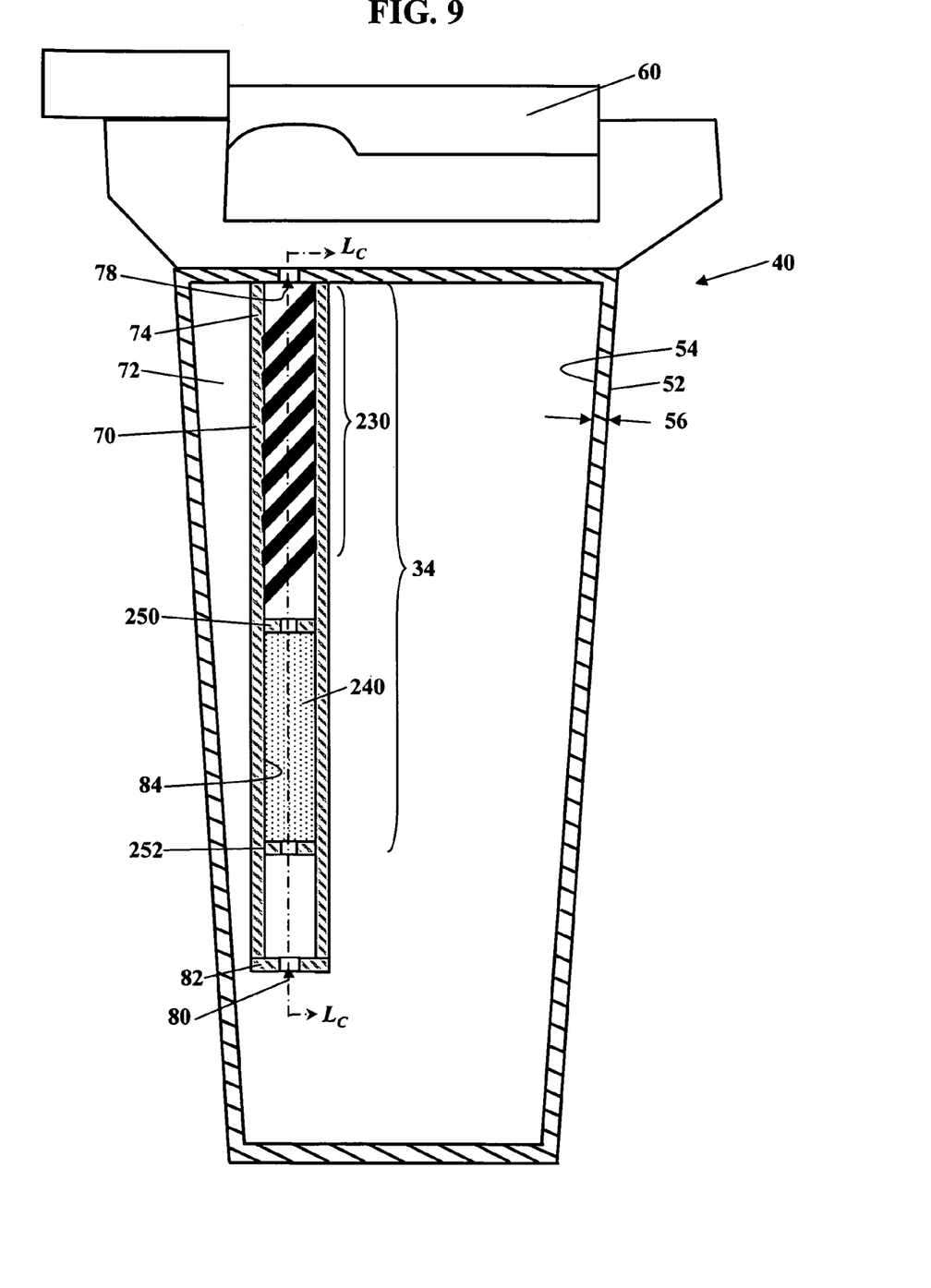
FIGS. 9 and 10 are sectional views of a conduit, according to exemplary embodiments.
Figure 10:
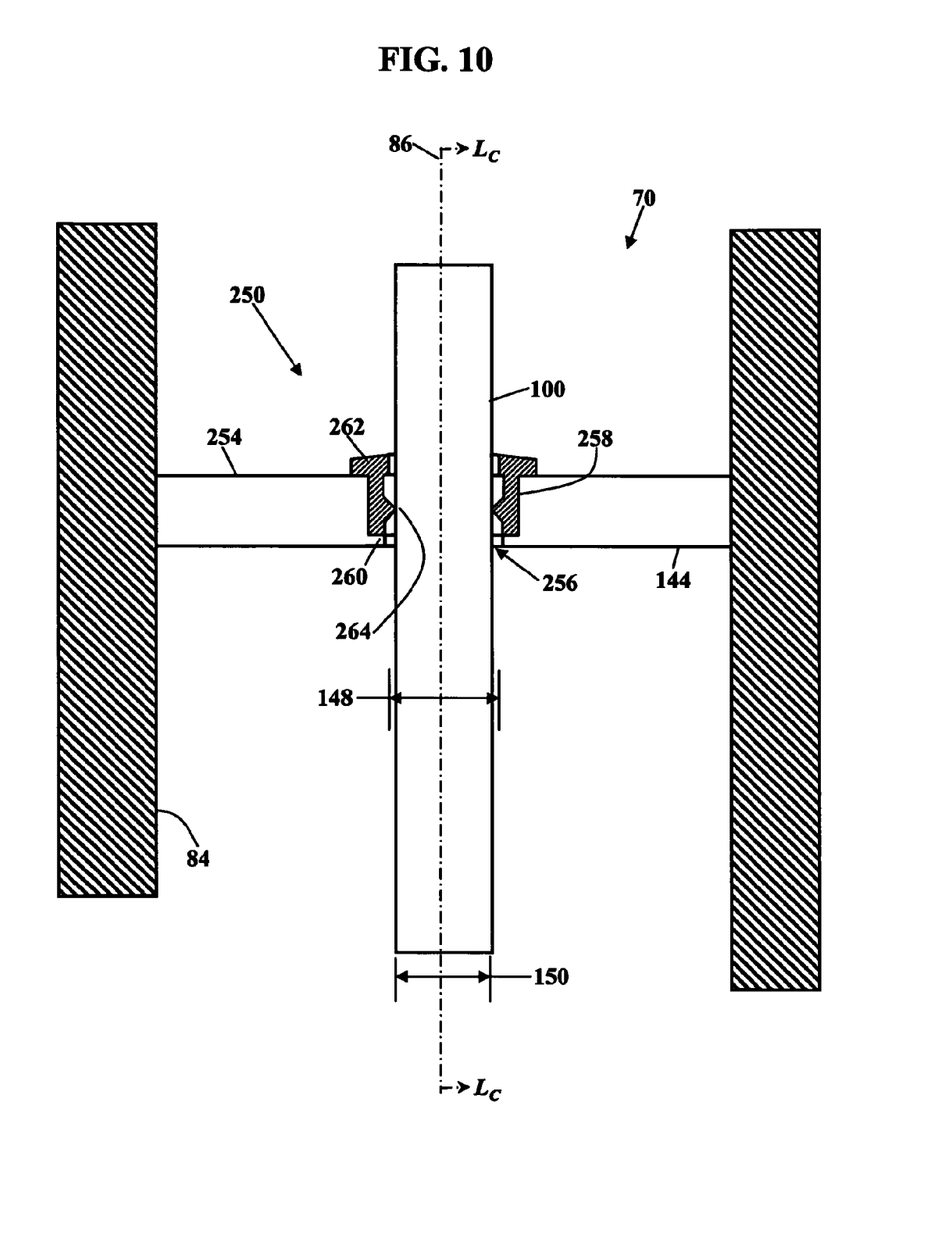

FIGS. 9 and 10 are more sectional views of the conduit 70, according to exemplary embodiments. Here the conduit 70 includes the electromagnetic shield 34. As the above paragraphs explained, the electromagnetic locator 20 senses electromagnetic signals to determine the location of a concealed object. If the receiver or processor (illustrated as reference numerals 42 and 44 in FIG. 2) is exposed to stray or unwanted reflections and/or emissions of electromagnetic waves, the accuracy of the electromagnetic locator 20 may be reduced. Unfortunately, then, the trigger mechanism (illustrated as reference numeral 32 in FIG. 4) may compromise the accuracy of the electromagnetic locator 20. If the trigger mechanism 32 has metallic components, and/or if the trigger mechanism 32 produces unwanted reflections or emissions, the trigger mechanism 32 may affect the performance of the electromagnetic locator 20.

The conduit 70, then, may include the electromagnetic shield 34. The electromagnetic shield 34 deflects or reduces electromagnetic emissions and reflections that may be caused by the trigger mechanism 32. FIG. 9, for example, illustrates an inner metallic coil 230 on the inner wall 84 of the conduit 70. The metallic coil 230 is helically wound or placed within at least a portion of the conduit 70 to electromagnetically shield the electronic components from the trigger mechanism 32. FIG. 9 also illustrates at least a portion of the conduit 70 filled with a ferrofluid 240. The ferrofluid 240 is composed of nano-scale ferromagnetic particles that are suspended in a carrier fluid (such as oil, an organic solvent, or water). When the ferrofluid 240 is exposed to an electromagnetic field, the nano-scale ferromagnetic particles polarize and align, thus electromagnetically shielding the receiver 42 and processor 44 from any interference caused by the trigger mechanism 32. The liquid ferrofluid 240 also bathes and lubricates at least a portion of the elongate rod 100 as the elongate rod 100 slides within the conduit 70. The electromagnetic shield 34 may also comprise a metallic foil that lines the inner side wall 84 of the conduit 70.

The conduit 70 may include sealing components, according to exemplary embodiments. Because the conduit 70 may be at least partially filled with the ferrofluid 240, the conduit 70 may include seals to prevent leakage. FIG. 9 illustrates an upper seal assembly 250 and a lower seal assembly 252. The upper seal assembly 250 bounds an upper portion of the conduit 70 that bathes the trigger assembly 32, while the lower seal assembly 252 bounds a lower portion of the conduit 70 that bathes the trigger assembly 32. The entire conduit 70 may be filled with the ferrofluid 240, or only a portion of the conduit 70 may be filled, as FIG. 9 simply illustrates.

FIG. 10 is an enlarged, detailed view of the upper seal assembly 250 illustrated in FIG. 9. The lower seal assembly 252 is similarly constructed and, thus, not illustrated. The upper seal assembly 250 has a cross member 254 having an open passageway 256. The open passageway 256 has a cylindrical inner side wall 258. Outwardly extending from the inner side wall 258 is an annular rim or step 260. A ring sleeve 262 is inserted or pressed into the open passageway 256, and a bottom surface of the ring sleeve 262 seats against the annular rim or step 260. The ring sleeve 262 thus has an outer diameter that is slightly smaller than an inner diameter of the open passageway 256. The ring sleeve 262 may thus be sized for a press-fit relationship. The ring sleeve 262 has an inner passage from which a resilient, elastic circumferential lip 264 protrudes. The conduit 70 slides within the inner passage of the ring sleeve 262, and the circumferential lip 264 helps reduce or prevent leakage of the ferrofluid 240 from the conduit 70. The ring sleeve 262 itself may be constructed of a polymer material.

Figure 11:
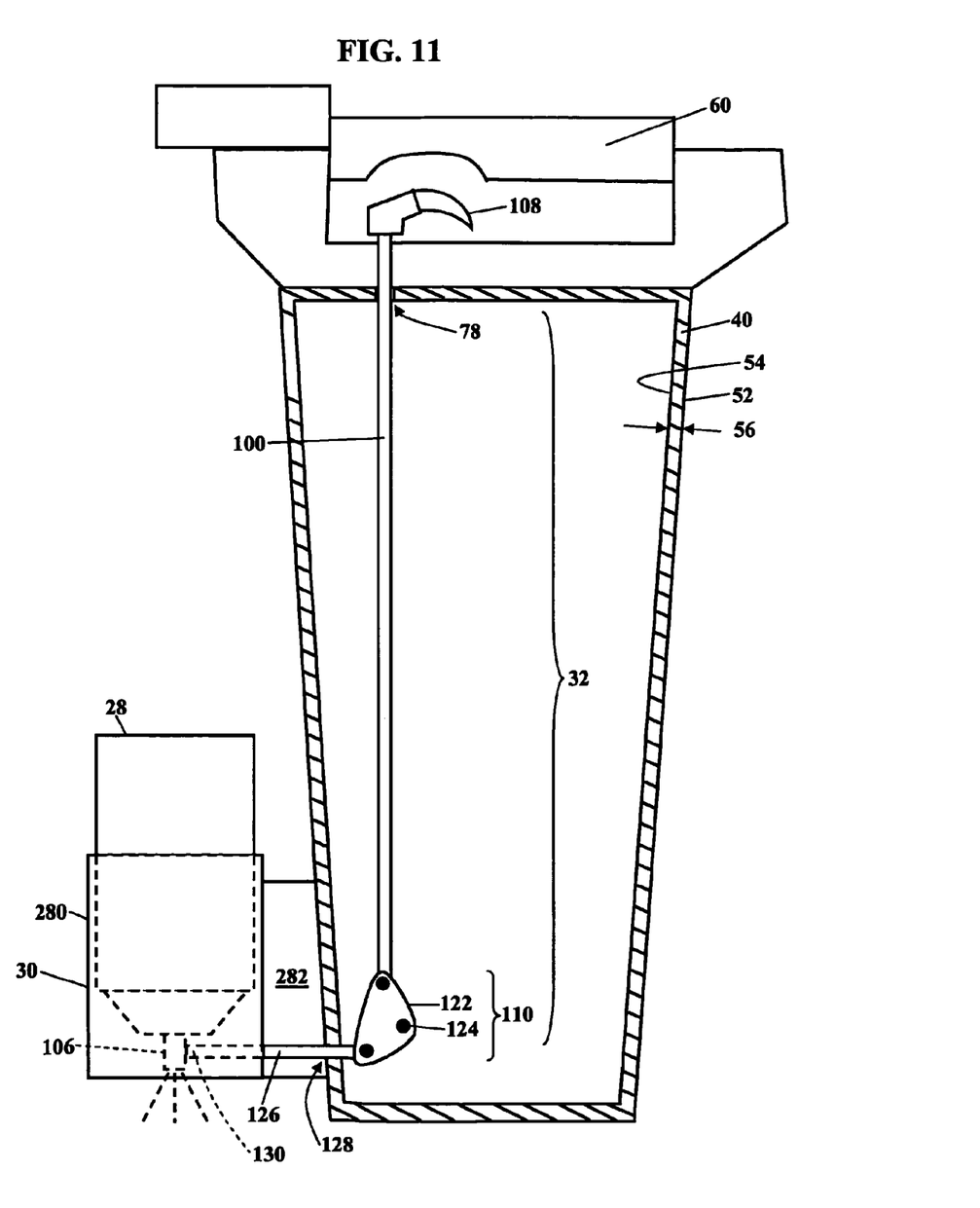
FIGS. 11-13 are detailed schematics illustrating a holder of an aerosol container, according to exemplary embodiments.
Figure 12:
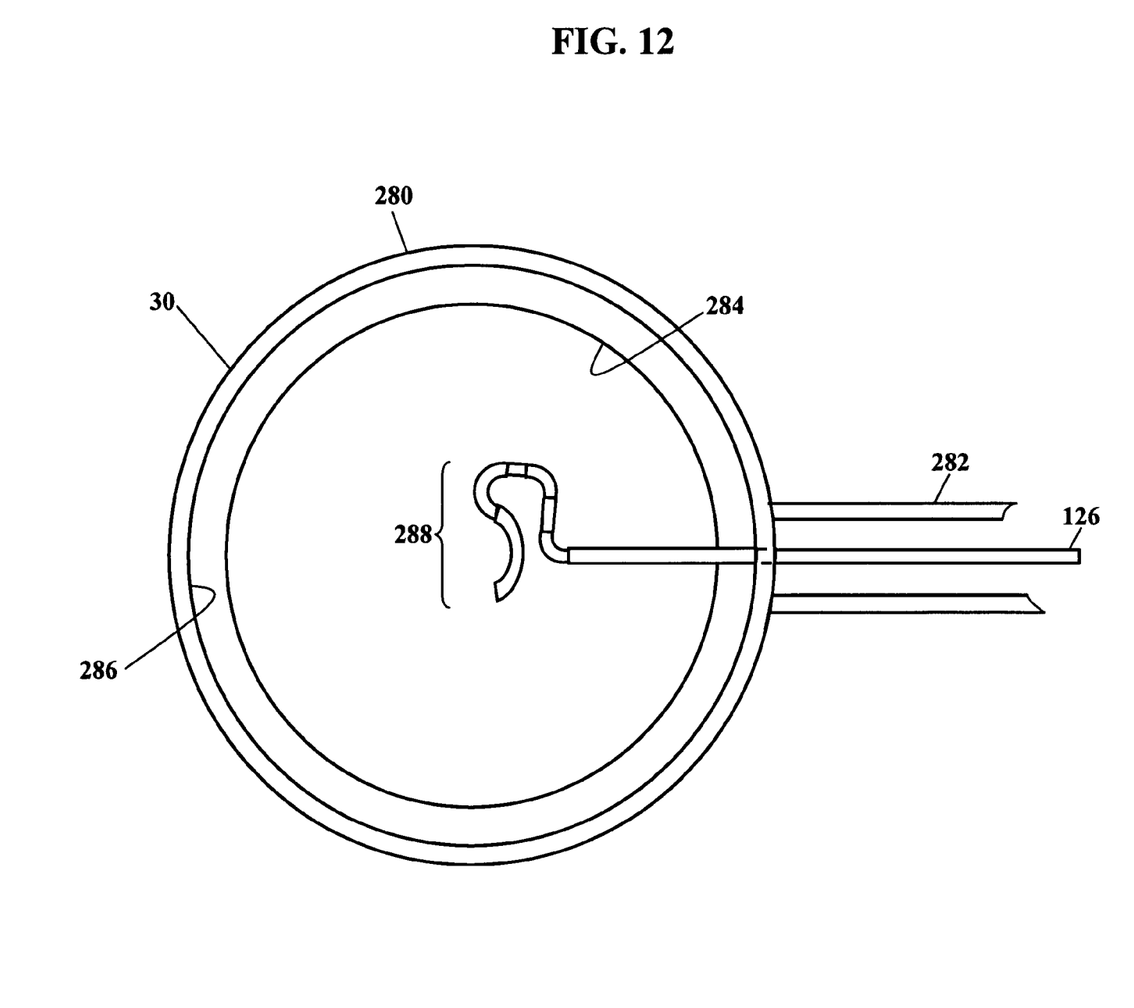
Figure 13:
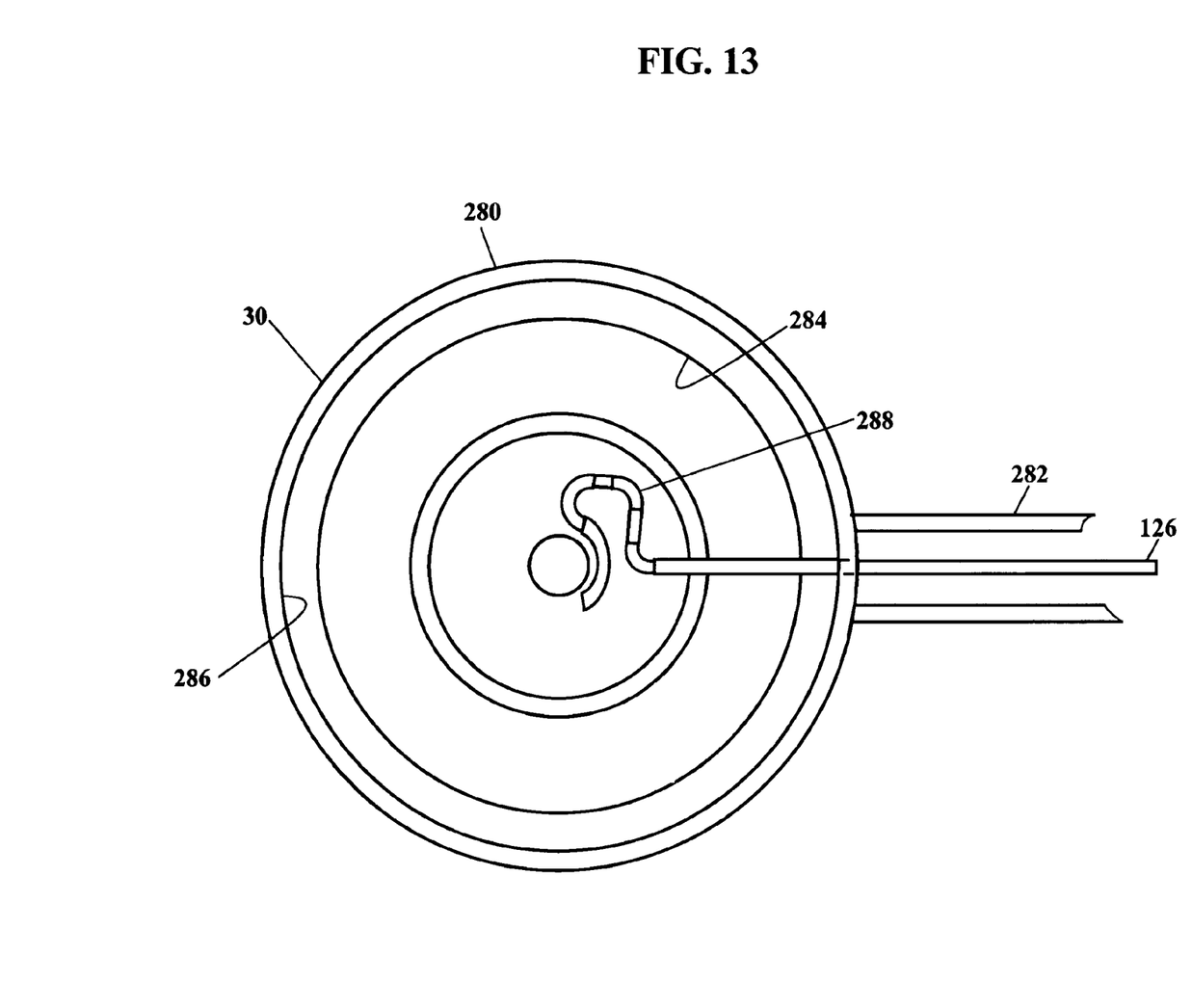

FIGS. 11-13 are detailed schematics illustrating the holder 30 of the aerosol container 28, according to exemplary embodiments. The holder 30 generally includes a cylindrical pocket 280 that is sized to accept the inverted aerosol container 28. The holder 30 may also include a spacer 282 that separates the cylindrical pocket 280 from the outer housing 40 of the electromagnetic locator (illustrated as reference numeral 20 in FIGS. 1 and 2). The spacer 282 may be configured to orient the aerosol container 28 at an approximately perpendicular position to the earth.

FIGS. 12 and 13 are bottom views of the cylindrical pocket 280. FIG. 12 illustrates the empty cylindrical pocket 280, while FIG. 13 illustrates the inverted aerosol container 28 inserted into the cylindrical pocket 280. The cylindrical pocket 280 has an annular rim 284 that outwardly extends from an inner surface 286 of the cylindrical pocket 280. The annular rim 284 has an inner diameter that is less than an outer diameter of the aerosol container 28, such that the annular rim 284 positions the aerosol container 28 within the cylindrical pocket 280 to engage the actuator 106 with the actuator arm 126.

FIGS. 12 and 13 also illustrate the actuator arm 126. As the above paragraphs explained, the cam mechanism (illustrated as reference numeral 110 in FIG. 11) translates vertical movement of the elongate rod 100 into lateral movement of the actuator arm 126. The actuator arm 126 extends through a passage or opening in the holder 30. A distal end 288 of the actuator arm 126 may be concavely-shaped to engage or bear against the actuator 106 of the aerosol container 28. As the user's finger moves the trigger mechanism 32, the actuator arm 126 moves the actuator 106 to discharge the contents of the aerosol container 28. When the user releases the trigger mechanism 32, the actuator 106 moves to its non-discharge position and ceases marking the earth.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. An apparatus for discharging contents of an aerosol container, the aerosol container having an actuator that discharges the contents, the apparatus comprising:

an elongate rod sliding within a conduit, the conduit having an upper end with an upper orifice through which an upper portion of the elongate rod slides, the conduit having a bottom orifice in a bottom floor through which a bottom portion of the elongate rod slides, the conduit having an inner wall defining a longitudinal axis;

means for actuating the actuator of the aerosol container such that movement of the elongate rod within the conduit moves the actuator between a discharge position and a non-discharge position, the means for actuating comprising a cam and an actuator arm, the cam pivoting about a pivot and the cam attached to a bottom end of the elongate rod, the actuator arm having an end attached to the cam and a concave-shaped distal end, the cam translating movement of the elongate rod and causing the distal end of the actuator arm to bear against the actuator to discharge the contents of the aerosol container;

a spring mount laterally extending from the inner wall of the conduit, the spring mount having an upper surface and lower surface that are substantially perpendicular to the movement of the elongate rod within the conduit, the spring mount having an open cylindrical passage extending from the upper surface to the lower surface through which the elongate rod slides, the cylindrical passage having a passage diameter greater than a rod diameter of the elongate rod, the cylindrical passage having a side wall that laterally confines the elongate rod; and a retention spring that restores the aerosol container's actuator to the non-discharge position, the retention spring having an inner diameter greater than the rod diameter of the elongate rod, the elongate rod passing through the inner diameter of the retention spring, the retention spring having an upper coil seated in a semi-circular channel in the lower surface of the spring mount, the semi-circular channel having a channel depth and a channel diameter greater than a wire diameter of the upper coil, the semi-circular channel laterally confining the upper coil to a substantially concentric position with the elongate rod.

2. The apparatus according to claim 1, further comprising a holder of the aerosol container, the holder having a cylindrical pocket sized to accept the aerosol container.

3. The apparatus according to claim 2, further comprising an annular rim outwardly extending from an inner surface of the cylindrical pocket, the annular rim having an inner diameter less than an outer diameter of the aerosol container, such that the annular rim positions the aerosol container within the cylindrical pocket to engage the actuator with the actuator arm.

4. The apparatus according to claim 1, wherein the retention spring has a bottom coil seated against a pair of diametrically opposed flanges that outwardly extend from an outer surface of the elongate rod, wherein sliding movement of the elongate rod in a first direction compresses the retention spring.

5. The apparatus according to claim 4, further comprising a notch in at least one of the flanges, the notch having a notch depth and a notch diameter greater than a wire diameter of the bottom coil, the notch laterally confining the bottom coil to a substantially concentric position with the elongate rod.

6. The apparatus according to claim 4, further comprising a washer seated between the bottom coil of the retention spring and the pair of diametrically opposed flanges, the washer having an inner diameter greater than the rod diameter of the elongate rod, but the inner diameter of the washer being smaller than an inner coil diameter of the bottom coil, the elongate rod passing through the inner diameter of the retention spring and the inner diameter of the washer.

7. The apparatus according to claim 1, further comprising a rod guide laterally extending from the inner wall of the conduit, the rod guide having an upper surface and lower surface that are substantially perpendicular to the movement of the elongate rod within the conduit, the rod guide having an open cylindrical passage extending from the upper surface to the lower surface through which the elongate rod slides, the cylindrical passage having a passage diameter greater than a rod diameter of the elongate rod, the cylindrical passage having a side wall that laterally confines the elongate rod.

8. An apparatus for locating a concealed object and for discharging the contents of an aerosol container, the aerosol container having an actuator that discharges the contents to indicate a location of the concealed object, the apparatus comprising:

a housing enclosing an inner volume;

a hollow conduit extending along the housing, the conduit having an upper end with an upper orifice to an outer surface of the housing, the conduit having a bottom floor with a bottom orifice in the bottom floor, the conduit having an inner wall defining a longitudinal axis;

an elongate rod sliding within the conduit, the elongate rod having an upper portion extending through the upper orifice and a lower portion extending through the bottom orifice;

means for actuating the actuator of the aerosol container such that movement of the elongate rod within the conduit moves the actuator between a discharge position and a non-discharge position; and a receiver for receiving electromagnetic signals.

9. The apparatus according to claim 8, further comprising a processor for processing the electromagnetic signals.

10. The apparatus according to claim 9, further comprising a user interface for indicating the location of the concealed object, based upon processed electromagnetic signals.

11. The apparatus according to claim 8, wherein the means for actuating the actuator comprises:

a cam pivoting about a pivot, the cam attached to a bottom end of the elongate rod; and an actuator arm having an end attached to the cam and a concave-shaped distal end, wherein the cam translates movement of the elongate rod and causes the distal end of the actuator arm to bear against the actuator to discharge the contents of the aerosol container.

12. The apparatus according to claim 8, further comprising a rod guide laterally extending from the inner wall of the conduit, the rod guide having an upper surface and lower surface that are substantially perpendicular to the movement of the elongate rod within the conduit, the rod guide having an open cylindrical passage extending from the upper surface to the lower surface through which the elongate rod slides, the cylindrical passage having a passage diameter greater than a rod diameter of the elongate rod, the cylindrical passage having a side wall that laterally confines the elongate rod.

13. The apparatus according to claim 8, further comprising a spring mount laterally extending from the inner wall of the conduit, the spring mount having an upper surface and lower surface that are substantially perpendicular to the movement of the elongate rod within the conduit, the spring mount having an open cylindrical passage extending from the upper surface to the lower surface through which the elongate rod slides, the cylindrical passage having a passage diameter greater than a rod diameter of the elongate rod, the cylindrical passage having a side wall that laterally confines the elongate rod.

14. The apparatus according to claim 13, further comprising a retention spring that restores the aerosol container's actuator to the non-discharge position, the retention spring having an inner diameter greater than the rod diameter of the elongate rod, the elongate rod passing through the inner diameter of the retention spring, the retention spring having an upper coil seated in a semi-circular channel in the lower surface of the spring mount, the semi-circular channel having a channel depth and a channel diameter greater than a wire diameter of the upper coil, the semi-circular channel laterally confining the upper coil to a substantially concentric position with the elongate rod.

15. An apparatus for locating a concealed object and for discharging contents of an aerosol container, the aerosol container having an actuator that discharges the contents to indicate a location of the concealed object, the apparatus comprising:

a housing enclosing an inner volume;

a hollow conduit extending along the housing, the conduit having an upper end with an upper orifice to an outer surface of the housing, the conduit having a bottom floor with a bottom orifice in the bottom floor, the conduit having an inner wall defining a longitudinal axis;

an elongate rod sliding within the conduit, the elongate rod having an upper portion extending through the upper orifice and a lower portion extending through the bottom orifice;

a liquid electromagnetic shield that bathes at least a portion of the elongate rod as the elongate rod slides within the conduit; and means for actuating the actuator of the aerosol container such that movement of the elongate rod within the conduit moves the actuator between a discharge position and a non-discharge position.

* * * * *